Dec. 26, 1961 H. C. HIBBARD 3,014,651
CORRELATION OF SEISMIC RECORDS
Filed June 19, 1957 3 Sheets-Sheet 1

Haines Champlin Hibbard  Inventor

By James A. Reilly  Attorney

Dec. 26, 1961     H. C. HIBBARD     3,014,651
CORRELATION OF SEISMIC RECORDS
Filed June 19, 1957     3 Sheets-Sheet 2

Haines Champlin Hibbard    Inventor

By *James A. Reilly*    Attorney

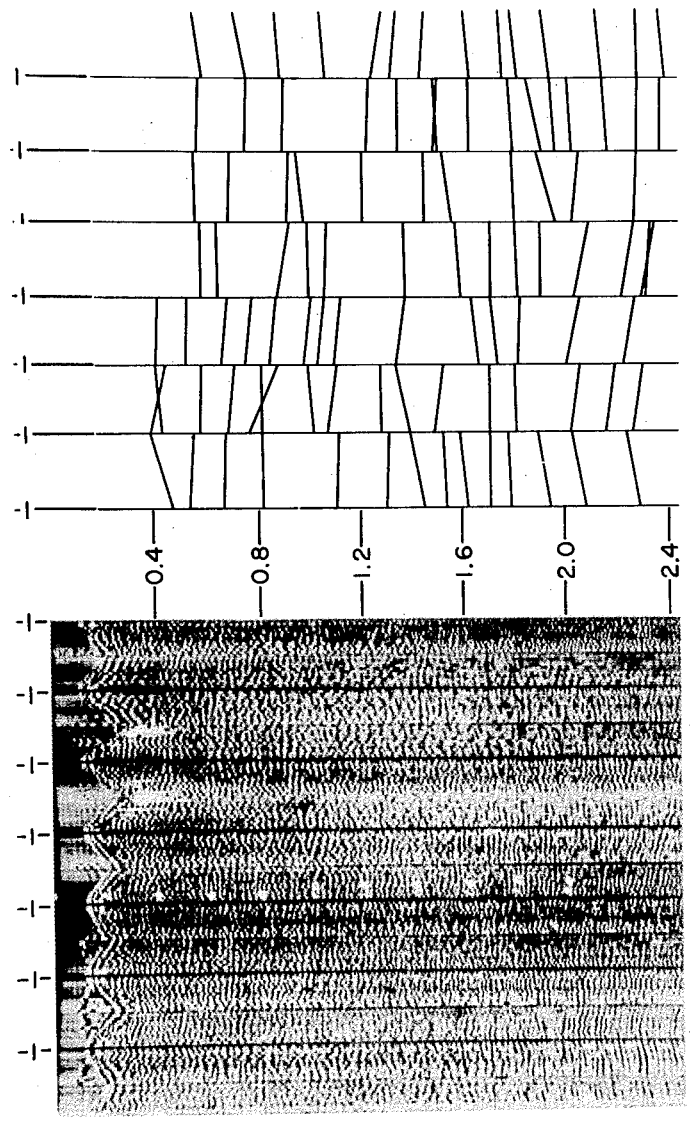
FIGURE 4 CORRELATOR SECTION
FIGURE 3 VDF SECTION

3,014,651
CORRELATION OF SEISMIC RECORDS
Haines C. Hibbard, Tulsa, Okla., assignor, by mesne assignments, to Jersey Production Research Company
Filed June 19, 1957, Ser. No. 666,550
15 Claims. (Cl. 235—61.6)

This invention is broadly concerned with the analysis and correlation of seismic records. More particularly, the invention pertains to a system for scanning and reproducing the information on a reproducible seismic record in a manner to establish the most probable correlation of the information on the record. The invention is especially directed toward an apparatus for scanning and reproducing variable density-type seismic records and for thereafter visually presenting the degrees of correlation that exist for probable events that are contained within the record. In a preferred aspect of the invention, means are provided for depicting in visual form the most probable orientation of the crossings in a variable density seismic section.

Geophysical prospecting procedures using artificially induced seismic disturbances have found wide application in the search for petroleum and other mineral deposits. In all of these methods, it is the general practice to initiate an explosion or other seismic disturbance at a point near the surface of the earth and to direct seismic waves downward into the earth from that point. The waves continue to travel downward within the earth until they encounter discontinuities in the earth's structure in the form of various substrata, faults, and the like. The discontinuities have the effect of reflecting at least a portion of the energy in the seismic waves back toward the surface of the earth. By arranging a plurality of geophones or other seismic detectors at spaced distances from the seismic disturbance point, it is possible to detect the arrival of the reflected seismic waves at the surface of the earth. Furthermore, by using a seismograph including suitable timing devices and recording means, it is possible to determine not only the magnitude of the signals received by the various detectors but also to measure the times required for the seismic wave to travel from the disturbance point down to the various discontinuities and thence to the geophones. By knowing this information and by measuring the distances between the various detection points and the disturbance point—and by further measuring or assuming velocities of seismic waves in the particular section of the earth under study—it is possible to determine the nature and depths of the various discontinuities beneath the surface of the earth.

Generally speaking, the signals that are generated by a spread of seismic detectors in a seismic observation are recorded by a seismograph in the form of separate side-by-side channels of information on a suitable recording medium. Movement of the recording medium relative to its recording device is closely controlled throughout the seismic observation, and each channel of information on the medium is therefore a reasonably accurate record with time of the output of the various detectors. Thus, each channel of information on the seismogram produced during a seismic observation is, in effect, a record of the "seismic signal" which has been generated at a particular seismic detector station in the observation.

Inasmuch as the individual geophone or detector stations in a seismic observation are generally at different distances from the shot point, and since the stations are generally also at different levels relative to a predetermined datum, it will be recognized that corresponding reflections on the different traces in a seismogram will usually occur at different points along the seismogram. Persons interpreting the information on a seismogram therefore find it necessary to apply corrections to the individual traces before accurate interpretation of the traces may be made. The corrections include so-called "static" or "fixed" corrections, as well as "dynamic" or "variable" corrections. Static corrections include elevation and weathering corrections, and each point along any given seismic trace receives the same amount of this type of correction. Dynamic corrections, on the other hand, include "spread" corrections; and each point along any given seismic trace generally receives a varying amount of this type of correction.

Various methods and apparatus have been proposed and used for correcting seismograms. A particularly effective and attractive system consists in generating a variable density photographic section in which each seismic signal is represented by a separate variable density photographic trace. Each trace is corrected along its length for dynamic corrections, and each trace is further displaced longitudinally with respect to a predetermined datum so as to correct for static corrections. The widths of the traces are also preferably adjusted so as to correspond to geophone station spacings, and the final assembly of traces therefore constitutes a generally striking representation of a cross section of the earth. The product is popularly referred to as a variable density section or corrected record.

A seismic section, it will be noted, comprises a plurality of seismic traces and generally is an assembly of several corrected seismograms or seismic records. Furthermore, sections can now be prepared substantially automatically from virtually all known types of seismograms. Thus, variable density sections may readily be made from reproducible seismograms (e.g., magnetic or variable density types) or visual seismograms (e.g., the oscillographic type).

Variable density sections have proven to be extremely helpful and valuable to persons interpreting seismic information. It has been the general experience that such sections show the existence of seismic "events" or reflections much more clearly than do other techniques of seismic data presentation.

While variable density sections have shown themselves to be very helpful in seismic interpretation, nevertheless there are still occasions where seismic information is so complex as to render interpretation of sections well-nigh impossible. "Crossings" on the sections are difficult to follow, and any one of a large number of seemingly contradictory correlations may be made. Unfortunately, these very poorly defined sections are frequently obtained in areas of complex geology where the possibilities of oil traps and the like are especially favorable. Expressed otherwise, those areas which result in very complex seismic presentation are all too frequently areas of particular interest from a prospecting standpoint.

It is, accordingly, an object of the present invention to provide an improved system for analyzing seismic information. It is a further object of the invention to provide an apparatus which greatly facilitates and simplifies the problem of determining "crossings" that exist within seismic sections—especially sections of the variable density type. It is a more particular object of the invention to provide means for analyzing automatically a variable density seismic section so as to indicate visually the most probable orientation and location of subterranean structures illustrated in the section. It is a further particular object of the invention to provide means for "high-grading" the information within a variable density seismic section so as to emphasize information from reflecting horizons and to de-emphasize or eliminate undesirable information including "noise" and reflections received from directions other than vertically below the geophone stations.

These and related readily apparent objects may be attained by means of a novel scanning system using reproducible multi-trace seismic records wherein a zero seismic signal is represented by a neutral value on the records. Thus, variable density sections—which are preferred forms of reproducible records—are prepared so that a zero seismic signal is recorded as a neutral gray shade. Signals other than zero are recorded as shades lighter or darker than the gray shade, depending upon their sign.

More particularly, the invention comprises a scanning and reproducing system wherein information is obtained from a reproducible seismic record in a manner especially adapted to emphasize reflections that are contained, but masked, within the record. Thus, a plurality of recorded traces is simultaneously reproduced by scanning the traces interval-by-interval along their length to generate a plurality of electrical signals—each interval accounting for a separate such signal. The signal reproduced for each interval is, in essence, an electrical transient; and each instantaneous value of the signal or transient is a summation of the instantaneous signal energies rep.oduced for the various traces. It should be noted that this summation signal may be zero in the presence of very strong signals if they are randomly phased. When a reflection line-up is encountered parallel to the scanning beam, a strong sum signal maximum can be obtained.

The summation signal is then subjected to computing blocks which modify the amplitude variations and which generate a new electrical transient wherein any amplitude variations in the summation signal are emphasized. The new signal is fed to an integrator and integrated over each reproduction time interval to form a product signal whose magnitude is indicated or recorded in a conventional manner.

Each interval along a set of traces which is reproduced in accordance with this invention may be varied in its duration in accordance with the quality of the traces themselves. For example, with records of relatively good quality, the length of the scanning interval can be relatively short; whereas, with records of relatively poor quality, the interval should be relatively long. The optimum interval length for any given record or section may be readily ascertained by the operator with a modicum of experimentation and experience. Generally speaking, interval lengths of about 25 to 250 milliseconds of time (along a seismogram) have been found to be effective for wide ranges of seismic record quality; and an interval of about 100 to 150 milliseconds has been found to be quite satisfactory for the great majority of the usual seismograms. It will be recognized, of course, that the scanning interval should not be excessively short (i.e., of the order of 25 milliseconds or less); otherwise, the invention will do little more than simply reproduce the very information being analyzed.

The results, machine-wise, of the computation performed on the summation signal reproduced during each scanning interval are insensitive to the length of the interval. The longer periods upgrade the data more and present a simpler picture—or rather simpler data—for the operator to consider in translating the data ultimately recorded into a correlated section.

The reproduction and scanning phase or aspects of the invention are carried out so that each point along any given trace is reproduced and computed a plurality of times. For example, in a specific embodiment of the invention, each information point in a 100-millisecond interval is used 25 times when the gating interval moves four milliseconds later for each successive computation. In other words, the various intervals overlap one another.

Since it is an object of the invention to correlate information on a seismic record with regard to its angular disposition as well as its amplitude or magnitude, it follows that provision must be made in reproducing each interval of a record or set of traces to emphasize the angular disposition of the information on the record. This is done conveniently by establishing a predetermined angular relationship between the record and the transducer or other playback device which is used to reproduce the record. For example, in analyzing a variable density seismogram, a line-shaped beam of light is directed against the seismogram in a sharply focused manner so as to extend laterally across the traces to be scanned. The beam is then made angularly adjustable relative to the traces so that the traces may be scanned in various time-delay relationships. By scanning any given set of traces at different angles for reproduction, it is possible to establish quite accurately the most probable angular orientation of reflections within the seismogram.

The number of traces that are scanned simultaneously in following the present invention is not especially critical; however, it is a particular attribute and object of the invention that as many as 50 or more traces may be conveniently handled to advantage. Indeed, the invention is particularly intended and adapted to operate on from about 20 to 50 traces at a time.

At this point, it may be of interest to note that the variable density traces within a conventional variable density seismic section or other seismic record are generally about 0.030 to 0.060 inch wide and have been made as much as 1½ inches wide for some purposes. They are generally about 12 to 15 inches long, and as many as 2000 separate traces have been incorporated in a single section. From this information, it is apparent that the invention is most conveniently applied to the analysis of a variable density seismic section by simply analyzing the various seismograms individually that constitute the section.

Having briefly outlined the general nature of the invention, attention is directed to the drawing for a more complete understanding of the invention.

FIGURE 3 is a reduced-size photocopy of a complex variable density seismic section of a type readily susceptible to analysis by the present invention.

FIGURE 4 is a reduced-size photocopy of a section corresponding to the section of FIGURE 3 wherein reflections indicated by the present invention have been drawn in by hand.

Figure 1:
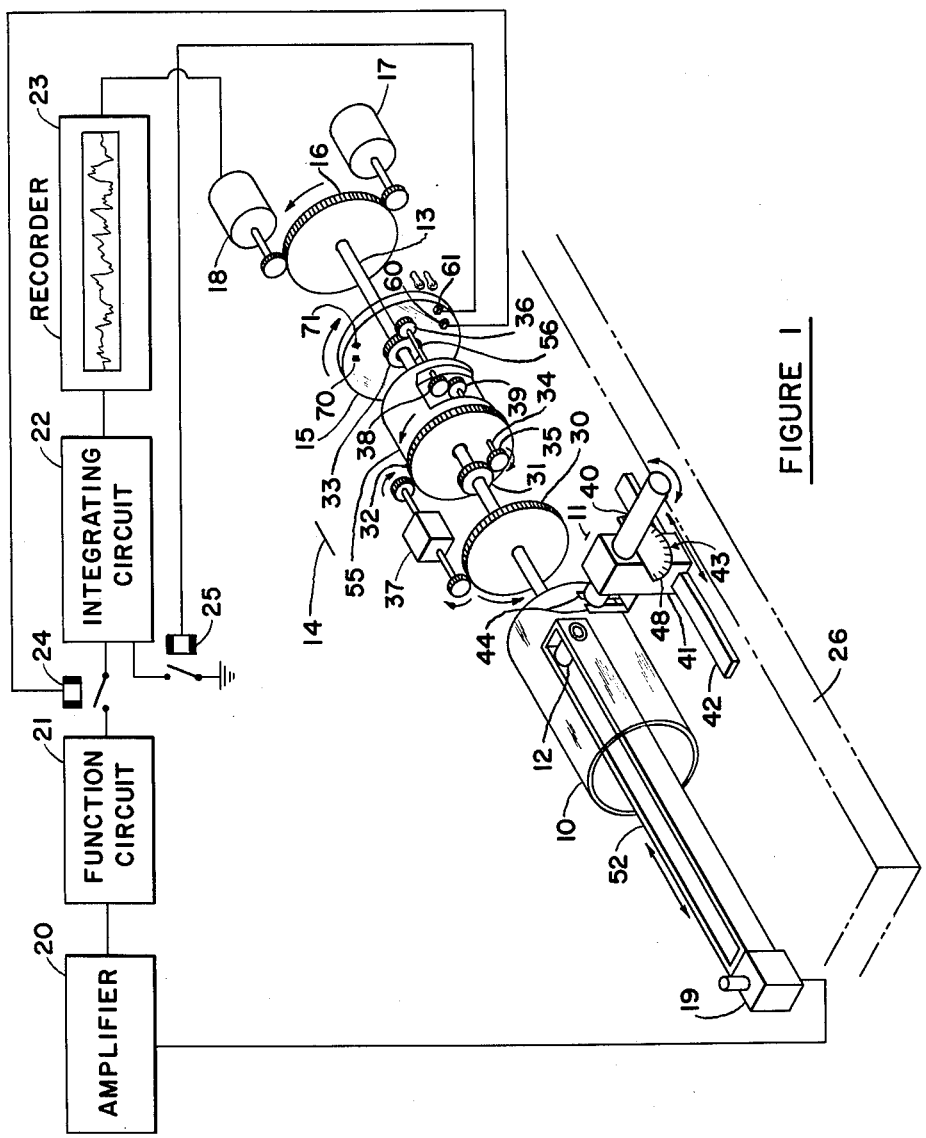
FIGURE 1 is a perspective diagrammatic view of a preferred apparatus embodiment of the invention.

Turning first to FIGURE 1, it may be seen that the major mechanical components shown in this figure include record drum 10, projection assembly 11, light collection assembly 12, drive shaft 13, differential drive assembly 14, gating wheel 15, drive gear 16, synchronous drive motor 17, and selsyn drive motor 18.

Also included in FIGURE 1 are electrical or electromechanical components including preamplifier 19, amplifier 20, function circuit means 21, integrating circuit means 22, strip chart recorder 23, and relays 24 and 25.

Returning to the mechanical components shown in FIGURE 1, drive shaft 13 is supported by means of suitable bearings from base member 26. It is secured rigidly to record drum 10 and drive gear 16 as well as gears 30 and 31. Also mounted on drive shaft 13—but freely rotatable with respect to the shaft as by means of suitable bearings—are gears 32 and 33 and gate wheel 15.

Differential gear shafts 34 and 56 are supported within cylindrical member 55, which is secured to gear 32, and are freely rotatable therewith—preferably by means of frictionless bearings. Gears 35 and 39 are mounted at either end of shaft 34, and gears 38 and 36 are mounted at either end of shaft 56. Gears 35 and 36 engage gears 31 and 33, respectively; and gears 38 and 39 engage each other.

Reduction gear box 37 is interposed betwen gears 30 and 32 and is operative to drive gear 32 at a lower speed than gear 30. Reduction gear 37 is supported from base member 26 and is mounted so as to be readily disconnected from gears 30 and 32.

Drive motor 17 is supported directly from base member 26 and is preferably a synchronous motor adapted to drive shaft 13 at substantially constant speed. Selsyn drive motor 18 is also supported from base member 26 and is coupled to a drive motor in the recorder 23 so as to coordinate the recording action of the recorder with the scanning action of the record drum 10.

Record drum 10 is an elongated, transparent cylinder which is adapted to receive a variable density seismic section on its outer cylindrical surface. Thus, it may be provided with clamping devices or equivalent means for holding a variable density seismic section on its outer surface. Ordinary masking tape has been entirely suitable for this purpose.

Located adjacent and exterior of the record drum is the light projection assembly 11 which comprises lamp house 40, block 41, and guide bar 42. The lamp house is rotatably and longitudinally adjustable within the block 41, and the block in turn is slidably adjustable along the length of bar 42. Movement of the lamp house along the length of the record drum is thereby easily obtained by merely sliding the block 41 along the length of the bar 42. Bar 42 is parallel to the axis of the drum and is rigidly supported by base member 26.

Figure 2:
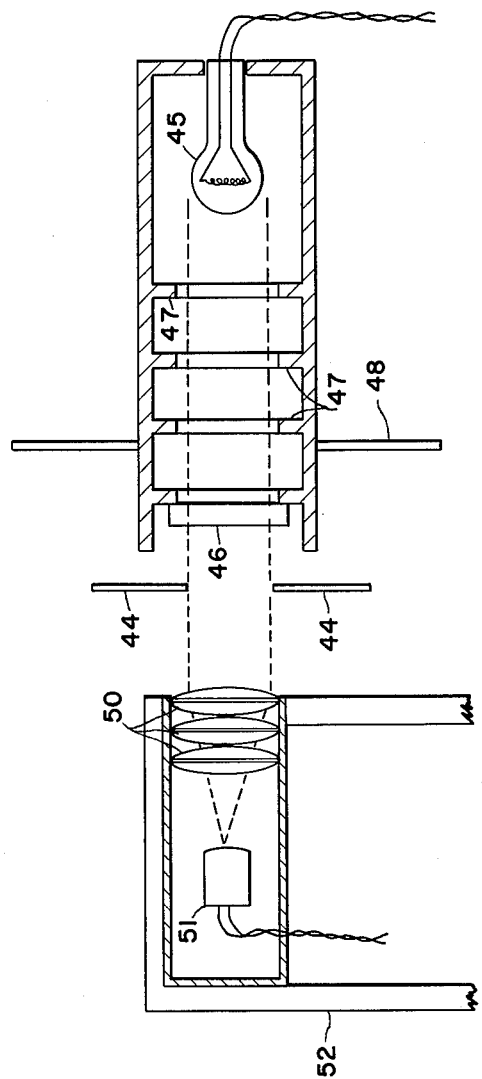
FIGURE 2 is a schematic sectional representation showing in greater detail the light projection and light collection assemblies of FIGURE 1.

For a more complete understanding of the lamp house 40, attention is directed to FIGURE 2, where this member is shown in longitudinal cross section. There it may be seen that it is, in effect, an elongated tubular member with a light source 45 mounted at one end and a cylindrical lens 46 mounted at the opposite end. The light source 45 preferably has an essentially line-shaped filament which is mounted such that the linear configuration of the filament is substantially parallel to the length of the lens 46. A plurality of baffles 47 spaced along the length of the lamp house helps to direct a beam of light toward the lens by preventing back-reflections and thereby facilitates the focusing action of the lens.

Angular scale 48 is supported from lamp house 40 so as to cooperate with index mark 43 and indicate the angular disposition of a light beam transmitted by lens 46 relative to the traces on the section mounted on drum 10. For example, the angular scale is conveniently arranged to indicate a zero degree angle when the light beam from lens 46 lies directly transverse to the length dimension of the traces of a section on the record drum.

As mentioned earlier, lamp house 40 is rotatably mounted within block 41. Thus, it is possible by simply turning the lamp house to cause a light beam transmitted through lens 46 to assume any desired angle relative to a seismic section. Furthermore, lamp house 40 is longitudinally adjustable within block 41 so that sharp focusing of its light beam on the drum 10 is easily made.

A pair of adjustable shutters 44 is mounted on the block 41 at each end of the lens 46. The shutters are adjustable in their positions so as to regulate the width or span of the light beam which is transmitted through the lens. It should be noted at this point that the width dimension of the light beam is considered to be parallel to the width dimension of the traces that are mounted on the drum 10.

Generally speaking, it has been found desirable to adjust the spacing between the shutters 44 so that a light beam from the lens 46 spans all of the traces in any given seismogram. Since most seismograms usually contain about 20 to 30 traces, this means that the light beam is generally adjusted in its width to scan some 20 to 30 traces. On occasion, however, it has been found desirable to scan as many as 40 to 50 traces at a time; and the exact number is not critical.

Mounted within record drum 10 is the light collection assembly 12 which comprises a lens system 50 and a phototransducer such as photoelectric cell 51. The lens system is of a type to concentrate a light beam from the lamp house 40 into a point or small area of light on the photoelectric cell 51. While a number of lens systems are suitable for this purpose, it has been found that a plurality of conventional convex lenses is very suitable for this purpose. The lenses and the photoelectric cell may be arranged essentially as shown in FIGURE 2.

Actual support of the light collection assembly 12 is made possible by means of elongated arms 52 which are movably supported from base member 26. The supporting means is not actually shown in FIGURE 1, but it should be of a nature to permit the light collection assembly 12 to be placed in alignment with lamp house 40. Supporting means of this type will be readily apparent to persons skilled in the art, and inclusion of this feature has not been made in the drawing in order to keep the drawing as simple as possible.

As shown in FIGURE 1, the electrical output of the photoelectric cell 51 is conveniently transmitted to a preamplifier 19 which in turn transmits an amplified signal to amplifying stage 20. The signal thus transmitted, it will be apparent, is essentially the algebraic sum of the light energy which has been transmitted from the lens 46 through a section on the drum 10 and impinged on the photoelectric cell 51. It will further be noted that this signal will have a frequency substantially equal to the frequency of the seismic signals recorded on the section, provided the section travels past the light beam at approximately the same speed that was used in recording the seismic information. Conveniently, however, the scanning operation is increased to about ten times the original recording speed, so that the signal transmitted by the preamplifier 19 has a frequency which is in a range readily handled by conventional audio amplifiers. High-quality amplification is therefore made possible using readily available audio equipment.

Once amplified, the signal from amplifier 20 is transmitted to a function circuit 21 of a type which is sensitive to amplitude variations in signals. For example, function circuits of the exponential type wherein the exponent of amplification is greater than one are suitable for the purposes of the invention. Squaring circuits have been found to be especially effective. Cubing circuits used in conjunction with absolute-value circuits are also very effective.

The signal generated by the function circuit 21 is integrated by means of any suitable integrating circuit 22, and it is thereafter recorded as on a recorder 23—e.g., a conventional strip chart recording potentiometer.

To more particularly illustrate the types of function and integrating circuits that are suitable for use in connection with this invention, attention is called to several units that are commercially available from George A. Philbrick Researchers, Inc., Boston, Massachusetts. This firm manufactures a Model MU/DV duplex multiplier-divider unit which is particularly suitable for use as function circuit 21, and it manufactures a Model K3–J integrating component which is suitable for use as the integrating circuit 22.

Operation of the integrating circuit 22 is coordinated with the scanning action of a light beam striking drum 10 by means of relays 24 and 25 or equivalent devices acting in response to photoelectric gates 60 and 61, respectively. Each gate conveniently consists of a light source and a photoelectric cell mounted on each side of the gating drum 15, which is constructed of a transparent plastic or equivalent material. Thus, light is normally transmitted through the gating wheel from each light source to its respective photoelectric cell until opaque areas or flags 70 and 71 provided on the wheel interrupt the light beams. For example, when flag 71 passes between the photoelectric cell and light source comprising gate 61, the signal to the normally open relay 25 is interrupted; and the relay operates to erase any signal which is stored within the integrating circuit 22. Subsequently, flag 70, in passing between the light source and photoelectric cell comprising gate 60, closes normally open relay 24 and causes integrating circuit 22 to receive a signal from function circuit 21.

Upon consideration, it will be recognized that the sequence of operation of relays 24 and 25 plays an important part in carrying out the present invention. Relay 25 must always precede relay 24 in its operation, and the time interval between each operation of relay 24 and each subsequent operation of relay 25 must be sufficient to enable recorder 23 to record whatever signal may be stored within integrating circuit 22. The latter operation, it will be apparent, is controlled primarily by whatever recording characteristics the recorder 23 possesses. Most commercially available recording potentiometers, for example, are capable of recording observations continually; but they require considerable time to traverse their recording charts. Because of the chart drive speed limitation, the computer output data must be generated slowly. The differential scanner drive does this very well, and it is adjustable to accommodate virtually any known recording system.

As explained earlier in this description, it is an important part of the present invention that a light beam from lamp house 40 be restricted in its scan during any given observation to a relatively short time interval (i.e., length interval) along a set of seismic traces. Since the light beam itself is a very fine line—perhaps equivalent to about one millisecond or less along a seismic trace—it will be apparent that the relay 24 must be closed for a period of time sufficient to enable the light beam to scan the desired trace interval. This condition is readily met by simply adjusting the arcual length of the opaque flag 70 on the gating wheel 15. The greater the length of the flag becomes, the greater will be the effective scanning time or interval of the light beam. Thus, as mentioned earlier, scanning intervals of about 25 to 250 milliseconds of time (along a seismogram) are generally effective for most analytical purposes. In general, the length of the scanning interval can be increased for sections or seismic records that are of relatively poor quality; and the interval should be shortened for records of relatively good quality.

It has also been mentioned earlier in this description that the gated light beam information period must move slowly relative to the length of the traces on the section during the over-all scanning or analytical operation. In other words, in scanning any given set of seismic traces, the light beam information gate period should preferably scan the region near one end of the trace; and it should then gradually progress along the traces with each succeeding scanning interval. This type of operation is readily attained by means of a differential drive assembly interposed between recording drum 10 and gating wheel 15. As shown in FIGURE 1, a differential gear train may be readily adapted for this purpose.

Referring to FIGURE 1, drum 10 is driven directly by shaft 13, whereas gating wheel 15 is driven indirectly through differential gear train 14. Gear 31, which is directly coupled to the shaft 13, drives gears 33 through gears 35, 39, 38, and 36. Gears 35, 39, 38, and 36, however, are mounted within the cylinder 55; and they therefore tend to rotate around gears 31 and 33 if any rotation of gear 32 takes place. The latter type of rotation is, in fact, realized directly from shaft 13 through gear 30 and reduction gear box 37.

Accordingly, the relative speeds of gating wheel 15 and record drum 10 are readily adjusted and controlled by preselection of the various gear sizes and reduction ratios within the gear box 37. In an actual example, these components have been selected so that wheel 15 rotates at the same rate as drum 10 when reduction gear 37 is disengaged.

To make the scan precess, the reduction ratio of the reduction gear box 37 is selected so that gear 32 rotates at a predetermined, very slow rate relative to gear 30. Wheel 15 accordingly then turns at a slightly different speed than drum 10, with the result that a different interval of the traces being analyzed at any one time is subjected to the correlation process. In an actual example, 1249 rotations of wheel 15 for every 1250 rotations of drum 10 have been found to be very satisfactory in analyzing traces about five seconds long—i.e., up to 12 inches long.

It will be recognized, of course, that relative rotational speeds of the gating wheel 15 and the record drum 10 other than the speed just mentioned may be used if so desired. The object of having different rotational rates for these members is simply to have the light beam from the lamp house 40 slowly precess or regress relative to drum 10 as the drum revolves. The precise amount of precession or regression is not critical, but it should not be so great as to cause inadequate overlap of the reproducing process.

Having described structural components which in combination constitute a preferred embodiment of the invention, attention is now directed toward a description of the best manner contemplated for practicing the invention. In this connection, a variable density multitrace seismic record—preferably a corrected seismic section—is mounted on the surface of drum 10 so that its individual traces extend around the drum. Furthermore, the record or section is placed on the drum in alignment with the opaque flags 70 and 71 on wheel 15 so that analysis of the traces is started at one or other end of the trace. The alignment may be conveniently attained by making the drum 10 or the wheel 15 rotatably adjustable relative to the other member. Set screws, lock nuts, or the like may be used for this purpose.

In placing a conventional seismic section on the drum 10, it will be recognized that a blank or meaningless area will generally exist in the region between the two ends of the traces on the record. In other words, there is generally a margin that extends or borders around any conventional section, and it will be readily seen that—in the absence of special provisions—this portion of a record in passing by the scanning light beam may generate signals that are undesirable for the amplifier 20 to receive. Accordingly, this portion of the record may be covered with a paper or other material having a light transmission characteristic roughly equivalent to a neutral value on the portion of the record which is of interest. Alternatively, a blanking circuit may be used which is adapted upon every revolution of the drum 10 to isolate the amplifier 20 from the preamplifier 19 during the period when the undesirable portion of the record passes the light beam. A convenient blanking circuit, for example, may consist of a contact mounted directly on the drum 10 or the drive gear 16 which closes and through suitable circuitry thereby disconnects amplifier 20 every time that an unwanted portion of a record on the drum passes the light beam. A preferred contact trigger is a photocell assembly similar to 60 and 61 mounted adjacent gear 16. Thus, a hole might be drilled through the periphery of this gear and a light source and photocell positioned on each side.

After a seismic record or section has been mounted on the drum 10, the light projection assembly 11 and the light collection assembly 12 are placed in alignment with one another and with a predetermined set of traces on the record or section. The lamp house 40 is adjusted longitudinally so as to focus as sharp a beam as possible through the traces of interest, and the angle of the beam is set to whatever angle is desired. The width of the beam is adjusted to span the desired number of traces simply by adjusting the shutters 44; and, in this connection, it has generally been found that scanning some 20 to 50 traces simultaneously is very satisfactory.

After the necessary adjustments have been made of the type just described, operation of the equipment may be started. Thus, the light beam 12 repeatedly spans the predetermined set of traces; and a predetermined interval along the traces is scanned and reproduced during each revolution of the drum. The interval is slightly different in its position along the traces during each revolution as a result of the differential drive assembly interposed between the drum 10 and the gating wheel 15; and the light beam therefore reproduces a slightly different interval along the traces on each successive rotation.

As each interval along the traces is reproduced, the energy reproduced for that interval is focused to a small point or spot on the photocell 51 in the light collection assembly 12; and the resulting electrical energy is supplied to the preamplifier 19 and thence to the amplifier 20. In each instance, the signal generated by the photocell depends upon the amount of energy received by the photocell; and the magnitude of the signal at any instant bears a relation to the algebraic sum of the energy transmitted through all of the traces at that instant.

Once the summed signal is amplified in amplifier 20, it is passed to the function circuit 20 which emphasizes consistent amplitude variations that extend across the traces; and the signal generated by this circuit is transmitted to the integrating circuit 22. Relay 24 is closed during this period as a result of the influence of the gate 60, and it stays closed so long as the opaque flag 70 is positioned between the photocell and the light source which comprise the gate.

Once the opaque flag 70 has passed gate 60, relay 24 is opened; and the integrating circuit is connected solely to the recording potentiometer 23. The potentiometer balances against the signal received from the integrating circuit 22 and records a value on its recording medium which indicates the magnitude of the signal.

After—preferably immediately after—recorder 23 has recorded a new value on its recording medium, opaque area 71 is timed to pass between the photocell and the light source which comprise gate 61. At this point, relay 25 is closed; and the signal on the integrating circuit is erased. The integrating circuit is thus ready to receive its next signal from function circuit 21 when the relay 24 again closes. The reset time is made so short that the recorder response does not recognize the information gap.

The action just described is continuously repeating until the set of traces has been scanned throughout its entire length. At this point, the angle of the light beam 11 may be changed to another predetermined value and the entire operation repeated. Then, after the original set of traces has been scanned for whatever number and value of light beam angles are desired, the light projection assembly 11 and the light concentrating assembly 12 are re-positioned so as to scan the next desired set of traces. This action is repeated until the entire set of traces constituting the record or seismic section has been processed.

At this point, the operator of the machine possesses a set of recordings produced by recorder 23 which, in effect, are graphs wherein the amplitudes of the signals generated at each interval along the length of a set of seismic traces for a given light beam angle are plotted. These graphs are compared by the operator so as to determine the angular settings which produce the best correlations (and thus indicate the most probable reflections) along the traces. The operator may then plot this information as illustrated in FIGURE 4. The resulting graphic information has been found to be very helpful and valuable in interpreting the subterranean nature of various portions of the earth.

Before concluding this portion of the description, it should be noted that numerous variations and modifications are possible in the apparatus and method just described without departing from the scope of this invention. Thus, it is contemplated that variable density records or sections of a photographic positive type—either on film or paper—may be readily adapted for use with the invention. Referring to the apparatus in FIGURE 1, for example, a photographic positive paper print can be readily adapted for use simply by placing the light collection assembly 12 outside of the drum and in a position relative to the light beam from the lamp house 40 so as to receive reflected light from the surface of the record or section.

Furthermore, it will be recognized that numerous types of recorders or indicators may be used in place of a recording potentiometer. For example, a conventional indicating milliammeter has been used with success with the apparatus of FIGURE 1; but the use of instruments of this type is less preferred than the instrument actually illustrated and described in view of the hand-recording operation which is required.

The apparatus shown in FIGURE 1 is readily adapted to hand scanning as well as automatic scanning. In hand-scan operation, the gear box 37 is replaced by a manual gear counter unit. When this unit is in use, the computer stays on the same section of record unless the differential is manually moved to some other point of record time. Using this method, the operator can rapidly detail a variable density section directly to a correlator section. He uses the recorder only as an output indicator and plots hand-selected data directly on a final map. This method is much faster than the previous automatic operation but somewhat less objective.

As noted earlier in this description, it is possible to use any one of a large number of electrical circuits as the function circuit 21. Circuits of the type desired for use with the invention are readily available commercially, and increasing numbers of such circuits are becoming available each year.

While the invention operates most effectively on corrected seismic sections, it may also be used on uncorrected seismograms, although this type of operation is less preferred.

In addition to operating with variable density type seismic records, it is contemplated that the invention is capable of satisfactorily analyzing other types of reproducible records, including variable area records and magnetic records. The use of the latter two types of reproducible records, however, is much less preferred than the use of variable density records.

To recapitulate, the present invention relates to a computing system that assists an interpreter when reflections on a VDE section become submerged in noise or overrun by interfering waves of various kinds. When reflections are obscured in this manner, the number of man-hours needed to examine multitrace records (e.g., 24 traces) becomes prohibitive, and some faster method is needed. The seismic correlator of this invention uses the information from all 24 traces of such a record to emphasize the events having similar shapes and lying in a straight line across the record. The computer component of the system considers all the trace information, grades it by assigning an amplitude number to a reflection complex, and then shows at what angle the reflection complex crosses the record. The computer tends to reject signals that vary in shape or time relation across the record and gives a region of this type a low-amplitude correlation number, even though the individual trace amplitudes may be quite large.

In a presently used form of the invention, about an hour and a half of machine time is required to reduce a 24-trace record to a set of correlation curves. This is a maximum time based on a full five-second record length, with the analysis being at two-degree intervals from +20 to −20 degrees. If shorter record times are analyzed, the machine running time is reduced in proportion.

It will also be recognized that the output signals from the integrating circuit 22 in FIGURE 1 may be recorded in forms other than the variable amplitude trace form described hereinbefore. For example, the signals may be recorded in reproducible form as magnetic traces, variable density traces, variable area traces, etc., as is well known in the art.

Reproducible recording of the signals from integrating circuit 22 makes further correlation of the information thus recorded somewhat easier than is the case with hand-correlation procedures. Thus, a plurality of side-by-side reproducible traces may be generated, each trace presenting the degrees of correlation existing along a given seismic trace for a separate angle of inclination. The resulting record may then be examined visually or scanned transversely in much the same manner as described earlier to establish what the best correlations of angle and amplitude are at different times along each seismic trace.

What is claimed is:

1. In a system for the analysis of a multi-trace reproducible seismic record including reproducing means adapted to scan simultaneously along a plurality of said traces, the improvement which comprises means to repeatedly effect the scanning movement, means to adjust the reproducing means so as to reproduce the traces in a predetermined time-delay relationship between the traces, means to sum algebraically the signals reproduced from the traces, analog means to generate an electrical signal of a character to emphasize amplitude variations in the summed signal, means to integrate electrical signals, gating means operable upon each scan of the reproducing means to transmit the signal generated by said analog means to said integrating means during a predetermined short interval of the scan, means to exhibit the magnitude of each integrated signal, and means cooperable with said gating means to change the occurrence of said predetermined short interval for each successive scan such that the integrated signals obtained during successive scans of said reproducing means are derived from overlapping portions of said plurality of traces.

2. In an apparatus for the analysis of a multi-trace reproducible seismic record including reproducing means to scan repeatedly along the length of a plurality of said traces, the improvement which comprises means to adjust the position of the reproducing means relative to the plurality of traces so as to reproduce the traces in a predetermined time-delay trace relation, means to sum algebraically the individual signal energies reproduced from said plurality of traces during each scan for a predetermined interval along the traces, means to shift said predetermined interval for each successive scan such that the intervals for successive scans progress along the traces in an overlapping relation, analog means responsive to each summed signal to generate a second signal emphasizing amplitude variations in each summed signal, integrating means to integrate the second signal generated for each of said intervals, and means to exhibit the value of each integrated signal.

3. In a system for the analysis of a multi-trace reproducible seismic record including reproducing means adapted to effect a repeated scanning movement relative to a plurality of said traces, the improvement which comprises means to adjust the angular disposition of said reproducing means with respect to said plurality of traces so as to scan the traces in a predetermined time-delay relationship, means to sum algebraically the signals reproduced at each instant from said plurality of traces, analog means responsive to said summed signal to compute and generate a second signal of the character to emphasize amplitude variations in the summed signal, means to integrate said second signal during a short predetermined interval of each scanning movement between said reproducing means said plurality of traces, and means to exhibit the value of each integrated signal, and means cooperable with said integrating means to shift the occurrence of said predetermined interval for each successive scanning movement in a preselected progression.

4. An apparatus as defined in claim 3 wherein the analog means comprises electrical circuitry of a character to generate an electrical signal bearing an exponential relationship greater than one to the summed signal.

5. An apparatus as defined in claim 4 in which the analog means is electrical circuitry adapted to square the summed signal.

6. An apparatus for the analysis of a reproducible seismic multi-trace record which comprises in combination a first rotatable drum adapted to receive a seismic record around its cylindrical surface, transducer means adjacent said drum and adapted to reproduce a plurality of said traces upon each rotation of said drum, means to adjust the angular disposition of said transducer means relative to the traces on the record so as to reproduce the traces in a predetermined time-delay relation, means to sum algebraically the individual signals reproduced from each trace at each instant, electrical analog means of a character to generate an electrical signal emphasizing amplitude variations in the summed signal, integrating means of a character to integrate a signal received from said electrical analog means, gating means responsive to each rotation of said rotatable drum to gate a signal from the electrical analog means to the integrating means during a predetermined interval of each rotation, and differential drive means responsive to each rotation of the rotatable drum to effect an additional rotational displacement between said transducer means and said drum for each rotation of the drum.

7. In a system for the analysis of a multi-trace reproducible seismic record including a rotatable drum adapted to support the seismic record with the traces of the record extending around the drum and including transducing means adjacent the drum and adapted to repeatedly and simultaneously scan along a plurality of said traces, the improvement which comprises means cooperating with said transducing means to reproduce the plurality of traces in a predetermined time-delay relation, means to sum algebraically the signals reproduced simultaneously from said plurality of traces, analog means to generate a signal of a character to emphasize amplitude variations in the summed signal, means operative to integrate the generated signal, gating means operative to gate said second signal from said analog means to said integrating means during a predetermined interval of each rotation of the drum, means to exhibit the magnitude of the integrated signal for each interval, and means to operate said gating means at successive points along said plurality of traces for each successive rotation of the drum.

8. A method for the analysis of a multi-trace reproducible seismic record which comprises scanning successive overlapping intervals along the length of a plurality of said traces while maintaining a predetermined time-delay relation between the traces to generate transient signals representative of the seismic signals recorded in such intervals, algebraically and automatically summing the transient signals generated during each such scan to generate a first electrical signal, analogically generating a second electrical signal emphasizing amplitude variations in each said first signal, automatically integrating each said second signal and exhibiting the magnitude of each said integrated signal.

9. A method for the analysis of a multi-trace reproducible seismic record which comprises successively scanning overlapping intervals of information recorded along the length of a plurality of said traces while maintaining a predetermined time-delay relation between such traces to generate a succession of first electrical signals, each such first electrical signal being an algebraic summation of the information scanned during a separate one of said intervals, analogically generating a succession of second electrical signals of a character to emphasize amplitude variations in said first electrical signals, automatically integrating each said second signal, and exhibiting the magnitude of each integrated signal.

10. A method as defined in claim 9 in which each scanned interval is equivalent to about 25 to 150 milliseconds along the seismic record.

11. A method for the analysis of the seismic information recorded on a multi-trace reproducible seismic record which comprises successively scanning overlapping intervals along a plurality of said traces while maintaining a predetermined time-delay relation between said plurality of traces to generate a succession of first electrical signals which algebraically sum the information recorded on said intervals, analogically generating a separate second electrical signal in response to each said first electrical signal which is equal in value to its respective first electrical signal raised to an exponent greater than one, integrating each said second electrical signal, and exhibiting the magnitude of each said integrated signal.

12. A method for the analysis of the information contained on a multi-trace reproducible seismic record which comprises successively scanning overlapping intervals extending along a plurality of said traces while maintaining a predetermined time-delay relationship between the traces to generate a succession of first electrical signals, each said first electrical signal representing an algebraic summation of the information recorded on a separate one of said intervals, generating a second electrical signal in response to each said first electrical signal, each said second electrical signal bearing an exponential relation greater than one with respect to the value for its respective said first electrical signal, automatically integrating each said second electrical signal, and exhibiting the magnitude of each said integrated signal.

13. A method as defined in claim 12 in which each second electrical signal is the squared value of its respective first electrical signal.

14. In a method of analyzing a multi-trace reproducible seismic record which includes scanning simultaneously along a plurality of said traces to generate a signal representing an algebraic summation of the information thereby scanned and exhibiting such signal or a signal derived therefrom, the improvement which comprises scanning and summing said plurality of traces interval-by-interval along their length to generate a succession of electrical signals, a separate summation signal being generated for each such interval, and displacing successive ones of said intervals along said plurality of traces in overlapping relation.

15. A method as defined in claim 14 in which each interval is about 25 to 250 milliseconds of record time and the overlap for successive intervals is about four milliseconds of record time.

References Cited in the file of this patent

UNITED STATES PATENTS

| | | |
|---|---|---|
| 2,628,689 | Rieber | Feb. 17, 1953 |
| 2,710,943 | Doelz | June 14, 1955 |
| 2,876,428 | Skelton | Mar. 3, 1959 |